United States Patent
Kim et al.

(10) Patent No.: US 12,287,876 B1
(45) Date of Patent: Apr. 29, 2025

(54) ANOMALY DETECTION METHOD AND DEVICE BASED ON ARTIFICIAL NEURAL NETWORK

(71) Applicant: LLOYD K co., Ltd, Seongnam-si (KR)

(72) Inventors: Daehoon Kim, Seoul (KR); Jongkyun Jeong, Namyangju-si (KR); Jinhwan Seo, Seoul (KR)

(73) Assignee: LLOYD K co., Ltd, Seongnam-si (KR)

( * ) Notice: Subject to any disclaimer, the term of this patent is extended or adjusted under 35 U.S.C. 154(b) by 0 days.

(21) Appl. No.: 18/928,846

(22) Filed: Oct. 28, 2024

(30) Foreign Application Priority Data

Oct. 27, 2023 (KR) .......................... 10-2023-0145454

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .................. G06F 21/554; G06F 2221/034
See application file for complete search history.

(56) References Cited

U.S. PATENT DOCUMENTS

| | | | |
|---|---|---|---|
| 2008/0196099 A1* | 8/2008 | Shastri | H04L 41/0893 726/12 |
| 2008/0282338 A1* | 11/2008 | Beer | H04L 63/1408 726/22 |
| 2018/0027015 A1* | 1/2018 | Zavdi | H04L 63/1416 726/23 |
| 2018/0302354 A1* | 10/2018 | Lee | H04L 67/52 |
| 2019/0349351 A1* | 11/2019 | Verma | H04L 63/30 |
| 2020/0380074 A1* | 12/2020 | Li | G06N 20/00 |
| 2024/0236018 A1* | 7/2024 | Eldering | H04L 51/10 |

FOREIGN PATENT DOCUMENTS

| | | | | |
|---|---|---|---|---|
| CN | 112804196 A | | 5/2021 | |
| CN | 113010331 A | * | 6/2021 | ........... G06F 9/4843 |
| CN | 117522374 A | * | 2/2024 | ........... G06Q 10/20 |
| KR | 20240044832 A | * | 4/2024 | ........... H04L 51/04 |
| WO | WO-2017154574 A1 | * | 9/2017 | ........... G06Q 10/00 |

OTHER PUBLICATIONS

Cichosz, Anomaly detection in discussion form posts using Global Vectors, Institute of Computer Science Warsaw University of Technology, p. 1-12 (Year: 2018).*

"Written Decision on Registration" Office Action issued in KR 10-2023-0145454; mailed by the Korean Intellectual Property Office on Jan. 12, 2024.

* cited by examiner

*Primary Examiner* — Christopher A Revak

(74) *Attorney, Agent, or Firm* — Studebaker Brackett PLLC

(57) ABSTRACT

The present disclosure relates to an anomaly detection method based on an artificial neural network. The anomaly detection method based on the artificial neural network includes collecting first log data including first user log data and first system log data, and providing the collected first log data to a trained first artificial neural network model to perform anomaly detection for a plurality of users and systems.

15 Claims, 12 Drawing Sheets

ANOMALY DETECTION METHOD AND DEVICE BASED ON ARTIFICIAL NEURAL NETWORK

CROSS-REFERENCE TO RELATED APPLICATION

This application claims priority under 35 U.S.C § 119 to Korean Patent Application No. 10-2023-0145454, filed in the Korean Intellectual Property Office on Oct. 27, 2023, the entire contents of which are hereby incorporated by reference.

TECHNICAL FIELD

The present disclosure relates to an anomaly detection method and device based on an artificial neural network, and more particularly, to an anomaly detection method and device based on an artificial neural network that performs anomaly detection and security measures using an artificial neural network.

BACKGROUND

Recently, various security solutions using artificial intelligence are being widely used due to the technological development of the artificial intelligence. However, most of the conventional security solutions being used are limited in their functions to detect only data anomaly.

In cases where only anomaly is detected, it may be difficult for users to analyze the cause of an anomaly symptom and the solution to the anomaly symptom depending on their individual abilities and determinations, and accordingly, there is a limitation that it is difficult to perform appropriate security measures in a timely manner.

SUMMARY

An aspect of the present disclosure provides an anomaly detection method based on an artificial neural network, a computer program stored in a computer-readable medium, a computer-readable medium storing the computer program, and a device (system).

An aspect of the present disclosure may be implemented in various ways, including a method, a device (system), a computer program stored in a computer-readable medium, or a computer-readable medium storing the computer program.

According to an embodiment of the present disclosure, the anomaly detection method based on the artificial neural network performed by at least one processor includes: collecting first log data including first user log data and first system log data; providing the collected first log data to a trained first artificial neural network model to perform anomaly detection for a plurality of users and systems; extracting log data associated with the anomaly symptom as anomaly data when it is decided that the anomaly symptom is present on at least some of the plurality of users or systems in response to performing the anomaly detection; providing the extracted anomaly data to a trained second artificial neural network model to generate first message data in a natural language form including information on the anomaly symptom; generating a chat room associated with the anomaly symptom on a security application of a user terminal; and transmitting the first message data to the user terminal through the generated chat room.

According to an embodiment of the present disclosure, there is further included: collecting second log data including second user log data and second system log data for each of the plurality of users; and providing the collected second log data to the first artificial neural network model to train a user behavior pattern and a system operation pattern for each of the plurality of users.

According to an embodiment of the present disclosure, the first artificial neural network model decides that the anomaly symptom is present when an outlier that does not correspond to a user behavior pattern and a system operation pattern for each of the plurality of users is detected in the collected first log data.

According to an embodiment of the present disclosure, the generation of the first message data in the natural language form including the information on the anomaly symptom includes: deciding an object and a type corresponding to the anomaly symptom based on the anomaly data; and generating information on the anomaly symptom including a description of the object and type corresponding to the decided anomaly symptom.

According to an embodiment of the present disclosure, there is further included: receiving second message data including a query about the anomaly symptom from the user terminal through the chat room; providing the second message data to a trained third artificial neural network model to generate third message data including an answer to the query; and transmitting the generated third message data to the user terminal through the chat room.

According to an embodiment of the present disclosure, there is further included: generating list data including a list of recommended questions associated with the anomaly symptom; and providing the generated list data to the user terminal by associating the same with the chat room. The reception of the second message data including the query about the anomaly symptom includes receiving the second message data including the query about the anomaly symptom in response to a user input selecting one of the recommended questions included in the list data.

According to an embodiment of the present disclosure, there is further included: receiving fourth message data for executing security measures for the anomaly symptom from the user terminal through the chat room; providing the fourth message data to the trained third artificial neural network model to call a function associated with the fourth message data among a plurality of functions; and performing measures for the anomaly symptom based on the called function.

According to an embodiment of the present disclosure, the performance of the measures for the anomaly symptom based on the called function includes performing the measures for the anomaly symptom by operating an API associated with the called function when the function is called.

There is provided a computer program stored in a computer-readable recording medium for executing the aforementioned method according to one embodiment of the present disclosure on a computer.

A computing device according to an embodiment of the present disclosure includes a communication module, a memory, and at least one processor connected to the memory and configured to execute at least one computer-readable program included in the memory. The at least one program includes commands for: collecting first log data including first user log data and first system log data; providing the collected first log data to a trained first artificial neural network model to perform anomaly detection for a plurality of users and systems; extracting log data associated with the anomaly symptom as anomaly data when it is decided that the anomaly symptom is present on at least some of the plurality of users or systems in response to performing the anomaly detection; providing the extracted anomaly data to a trained second artificial neural network model to generate first message data in a natural language form including information on the anomaly symptom; generating a chat room associated with the anomaly symptom on a security application of a user terminal associated with a security manager; and transmitting the first message data to the user terminal through the generated chat room.

According to an embodiment of the present disclosure, the at least one program further includes commands for: collecting second log data including second user log data and second system log data for each of the plurality of users; and providing the collected second log data to the first artificial neural network model to train a user behavior pattern and a system operation pattern for each of the plurality of users.

According to an embodiment of the present disclosure, the at least one program further includes commands for: deciding an object and a type corresponding to the anomaly symptom based on the anomaly data; and generating information on the anomaly symptom including a description of the object and type corresponding to the decided anomaly symptom.

According to an embodiment of the present disclosure, the at least one program further includes commands for: receiving second message data including a query about the anomaly symptom from the user terminal through the chat room; providing the second message data to a trained third artificial neural network model to generate third message data including an answer to the query; and transmitting the generated third message data to the user terminal through the chat room.

According to an embodiment of the present disclosure, the at least one program further includes commands for: generating list data including a list of recommended questions associated with the anomaly symptom; providing the generated list data to the user terminal by associating the same with the chat room; and receiving the second message data including the query about the anomaly symptom in response to a user input selecting one of the recommended questions included in the list data.

According to an embodiment of the present disclosure, the at least one program further includes commands for: receiving fourth message data for executing security measures for the anomaly symptom from the user terminal through the chat room; providing the fourth message data to a trained third artificial neural network model to call a function associated with the fourth message data among a plurality of functions; and performing measures for the anomaly symptom based on the called function.

According to an embodiment of the present disclosure, the at least one program further includes commands for performing the measures for the anomaly symptom by operating an API associated with the called function when the function is called.

The benefits of the present disclosure are not limited to those mentioned above, and other benefits not mentioned may be clearly understood by those having ordinary skill in the technical field to which the present disclosure pertains (referred to as "those skilled in the art") from the following description.

BRIEF DESCRIPTION OF THE DRAWINGS

Embodiments of the present disclosure will be described with reference to the accompanying drawings, wherein like reference numerals represent like elements, but are not limited thereto.

DETAILED DESCRIPTION

Figure 1:
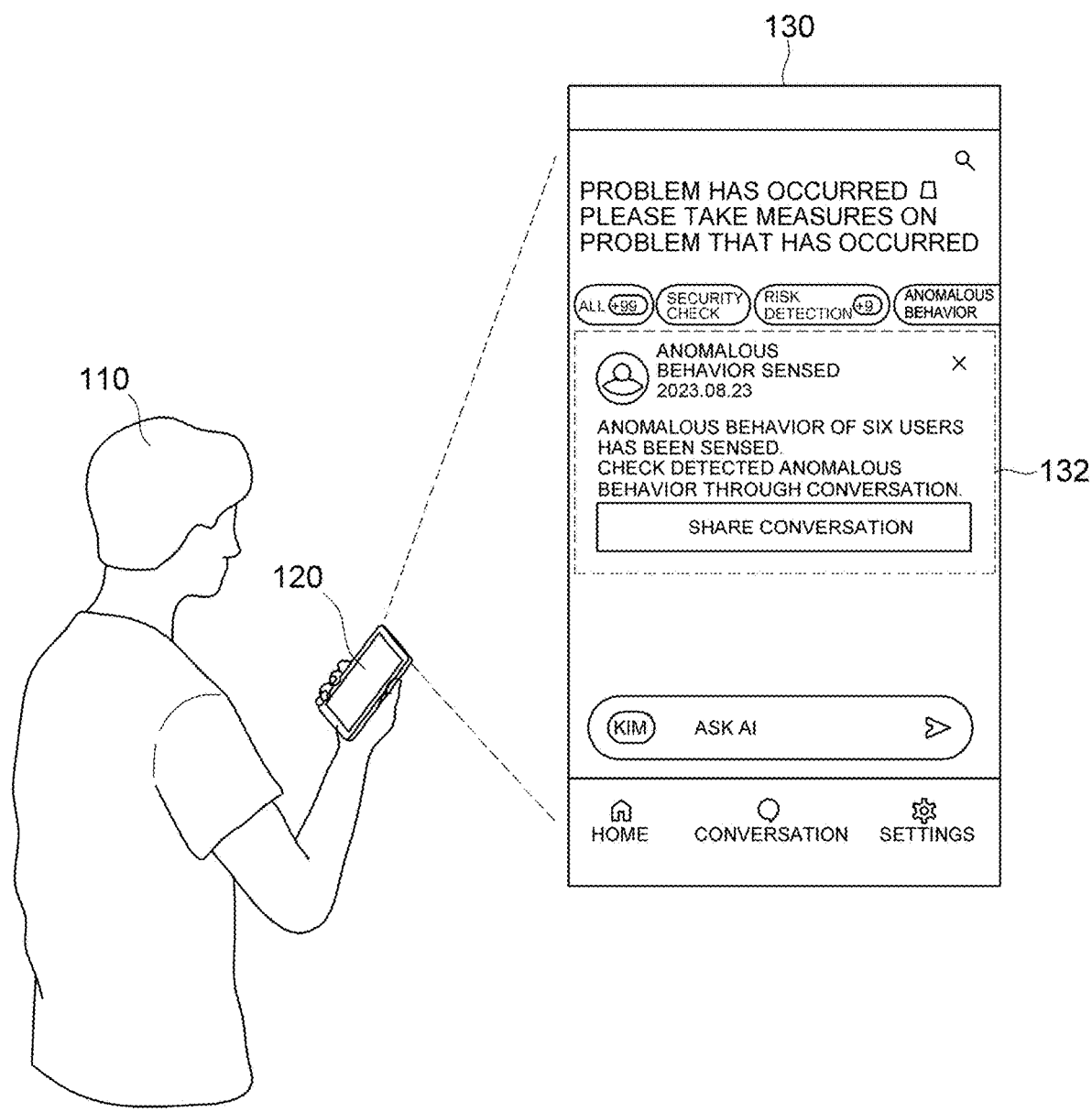
FIG. 1 is a diagram illustrating an example of providing a message through a security application operating on a user terminal according to an embodiment of the present disclosure.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding components are given the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the embodiments are merely provided to make the present disclosure complete, and to fully disclose the scope of the present disclosure to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Accordingly, the terms used in the present disclosure should be defined based on the meaning of the terms and the overall contents of the present disclosure rather than a simple name of each of the terms.

As used herein, the singular forms are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

As used herein, terms such as "comprises (includes)," "comprising (including)," etc. may indicate the presence of features, steps, operations, elements and/or components, although such terms do not exclude that one or more other functions, steps, operations, elements, components and/or combinations thereof are further added.

As used herein, when a particular component is referred to as "coupling," "combining," "connecting," "associating" or "reacting" to any other component, the particular component is directly coupled to, combined with, connected to and/or associated with or reacted with other components, without being limited thereto. For example, there may be one or more intermediate components between a particular component and another component. In addition, in the present disclosure, "and/or" may include each of one or more listed items or a combination of at least a portion of one or more items.

As used herein, terms such as "first" and "second" are used to distinguish a particular component from other components, and the aforementioned components are not limited by these terms. For example, a "first" component may be an element of the same or similar type as a "second" component.

As used herein, the term "artificial neural network model" is a large language model (LLM) trained to understand and generate human language, and may include, but is not limited to, a generative AI.

As used herein, the term "information on an anomaly symptom" may include a description of an object and type corresponding to the anomaly symptom. For example, when the anomaly symptom is related to a specific user, the information on the anomaly symptom may include a description of the name of a user detected by the anomaly symptom, the connection time and date of the user, the connection location, the connection target, and the type of the detected anomaly symptom. In another example, when the anomaly symptom is related to system security, the information on the anomaly symptom may include a description of a detected security vulnerability item and related legal provisions.

As used herein, the term "message data" refers to a message transmitted via an instant messaging service, and may include text data, image data, video data, files, etc. As used herein, the term "chat room" may refer to a virtual space or group generated by a security application installed on a user terminal, in which a computing device and a user may exchange various types of messages, files, etc.

FIG. 1 is a diagram illustrating an example of providing a message 132 through a security application operating on a user terminal 120 according to an embodiment of the present disclosure. A user 110 may receive the message 132 associated with an anomaly symptom from a computing device through the security application using the user terminal 120, or may request and acquire information on the anomaly symptom through communication with the computing device. Herein, the security application may support or provide an instant messaging service for mediating communication between the computing device and the user 110.

According to an embodiment, the user 110 may check the message 132 (for example, first message data) transmitted by the computing device and/or the chat room in which the message 132 was transmitted through a user interface 130 of the security application. For example, the computing device may collect log data in real time and provide the collected log data to a first artificial neural network model to perform anomaly detection. Then, when an anomaly symptom is found in the log data, the computing device may transmit the message 132 to the user terminal 120 through the security application.

According to an embodiment, the user 110 may check the message 132 displayed on the user interface 130 and exchange conversations with the computing device. For example, the user 110 may transmit a message requesting a detailed explanation of the anomaly symptom or inquiring about security measures through the user terminal 120. In this connection, the computing device may analyze the meaning of the message received from the user terminal 120 using a second artificial neural network model, and generate and provide an answer corresponding to the message. In other words, the user 110 may exchange conversations with the computing device based on the chat room generated in association with the anomaly symptom, and may simply check the content of the anomaly symptom.

According to an embodiment, the user 110 may exchange conversations with the computing device through the user terminal 120 and perform security measures for the anomaly symptom. For example, the user 110 may transmit a message requesting execution of security measures to the chat room associated with the anomaly symptom. In this connection, the computing device may call a function associated with the security measure requested by the user using a third artificial neural network model. When the function is called in this way, the computing device may operate an application programming interface (API) associated with the called function to perform measures for the anomaly symptom.

With this configuration, the user 110 may not only exchange conversations with the computing device about anomaly symptoms using the instant messaging service provided by the security application, but may also effectively respond to anomaly symptoms by simply requesting specific security measures according to the type of anomaly symptoms through conversation.

Figure 2:
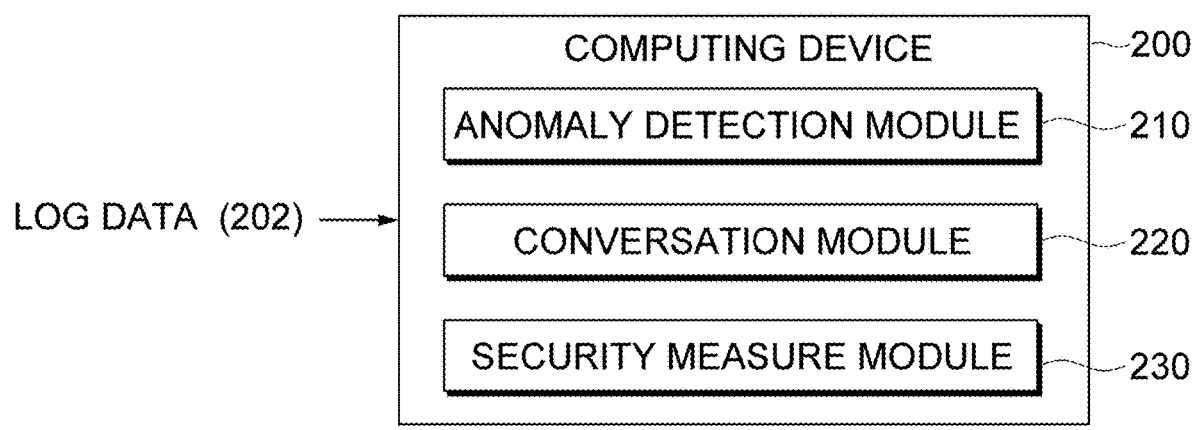
FIG. 2 is a functional block diagram illustrating the internal configuration of a computing device according to an embodiment of the present disclosure.

FIG. 2 is a functional block diagram illustrating the internal configuration of a computing device 200 according to an embodiment of the present disclosure. As described above, the computing device 200 may include an anomaly detection module 210, a conversation module 220, and a security measure module 230 as an arbitrary device for analyzing log data to detect anomaly symptoms in real time or to perform security measures.

According to an embodiment, the computing device 200 may collect log data including user log data and system log data from the security system. Herein, the user log data is data generated to indicate the computing operations of each user within a company, and may include data including user login records, access records, menu movement records, work records, mouse and keyboard usage records, PC usage history, etc. In addition, the system log data may be a security log left by a specialized security system, such as a network security log, a document security log, a server security log, etc. In other words, the computing device 200 may collect not only the system log data from the security system, but also the user log data indicating the operations of each user. In this connection, the computing device 200 may collect such log data in real time or at specific intervals.

When the log data is collected as such, the anomaly detection module 210 may provide the collected user log data and system log data to a trained first artificial neural network model to perform anomaly detection for a plurality of users and systems. In other words, the anomaly detection module 210 may consider the actions of a user along with the operation of the security system by using the user log data and the system log data together. Herein, the first artificial neural network model may be trained to recognize a user behavior pattern and a system behavior pattern for each user by using the user log data and the system log data, and may decide that an anomaly symptom is present when an outlier that does not correspond to the user behavior pattern and/or the system behavior pattern is detected. In other words, when the user activity or system operation that is different from the usual pattern is sensed, the anomaly detection module 210 may decide that an anomaly symptom is present.

According to an embodiment, in response to performing anomaly detection, when it is decided that anomaly symptoms are present in at least some of the users or systems among the plurality of users, log data associated with the anomaly symptoms may be extracted as anomaly data. In other words, at least some pieces of the collected log data may be extracted as anomaly data. In this connection, the conversation module 220 may provide the extracted anomaly data to a trained second artificial neural network model to generate first message data in a natural language form that includes information on the anomaly symptoms. In other words, the second artificial neural network model may perform a reporting function that converts the detected anomaly symptoms into information that may be easily read and determined by a person using the anomaly data.

Then, the conversation module 220 may generate the chat room associated with the anomaly symptoms on the security application of the user terminal associated with a security manager, and transmit the first message data to the user terminal through the generated chat room. In this connection, the conversation module 220 may generate a separate chat room for each anomaly symptom and transmit a message associated with the detected anomaly symptoms. When a message is transmitted, the security manager may simply check whether an anomaly symptom is detected and information on the detected anomaly symptom through the message transmitted to the chat room.

According to an embodiment, the security manager may check the message through the security application and exchange conversations with the third artificial neural network model about an anomaly symptom. For example, when the security manager inputs a message including a query about the anomaly symptom through the chat room, the conversation module 220 may receive second message data from the user terminal. In this connection, the conversation module 220 may provide the second message data to a trained third artificial neural network model to generate third message data including an answer to the query, and transmit the generated third message data to the user terminal through the chat room. Through this process, the security manager may simply check a security issue and analyze the content of the anomaly symptom by conducting a conversation with the third artificial neural network model.

According to an embodiment, the security manager may request security measures for the anomaly symptom using the security application. For example, when a security manager inputs a message including a security measure command for an anomaly symptom in the chat room, the security measure module 230 may receive fourth message data for executing security measures for the anomaly symptom from the user terminal. In this connection, the security measure module 230 may provide the fourth message data to the trained third artificial neural network model to call a function associated with the fourth message data among a plurality of functions, and perform measures for the anomaly symptom based on the called function.

According to an embodiment, the plurality of functions and APIs for the security measure may be predefined. When a message requesting the call of a specific function is received from the security manager, the security measure module 230 may operate the API associated with the called function to perform measures for the anomaly symptom. For example, the plurality of functions and APIs for performing security measures such as 'user blocking', 'policy change', and 'request for explanation from a relevant department' may be predefined, and security measures may be performed.

In FIG. 2, each functional configuration included in the computing device 200 is separately described, but this is merely to help understanding of the present disclosure, and two or more functions may be performed in one arithmetic device. In addition, in FIG. 2, the second artificial neural network model and the third artificial neural network model are illustrated as being separated, but this is not limited to, and the second artificial neural network model and the third artificial neural network model may be implemented as one model. With this configuration, the computing device 200 may detect anomaly symptoms in real time and notify a security manager. The security manager may effectively perform responses to anomaly symptoms, such as checking the contents of anomaly symptoms or requesting security measures, simply by exchanging messages on the security application.

Figure 3:
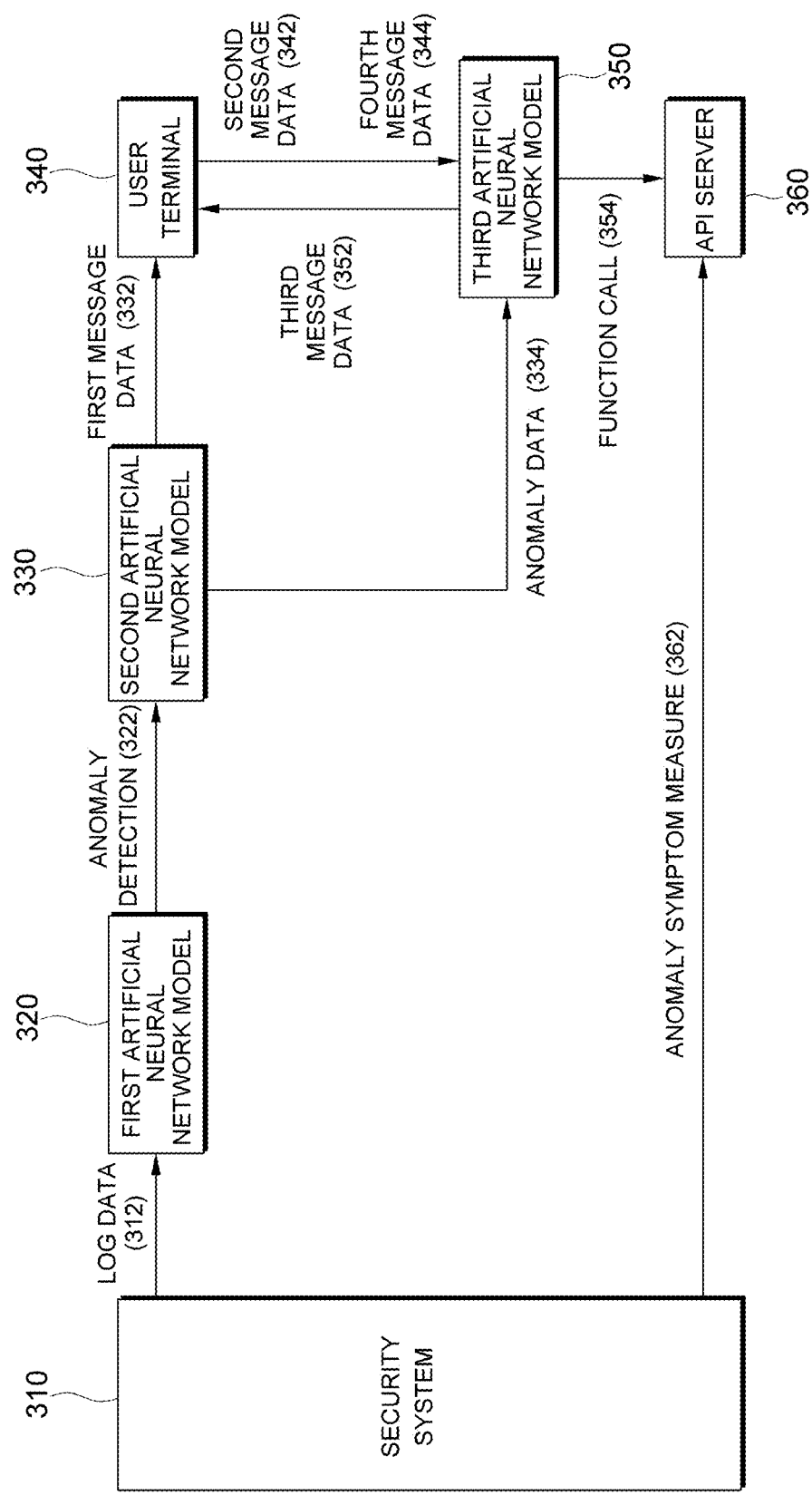
FIG. 3 is a block diagram illustrating an example of a process in which data is transmitted and received to detect an anomaly symptom and perform measures according to an embodiment of the present disclosure.

FIG. 3 is a block diagram illustrating an example of a process in which data is transmitted and received to detect an anomaly symptom and perform measures according to an embodiment of the present disclosure. For anomaly detection, log data 312 may be collected from a security system 310 to a first artificial neural network model 320. For example, the first artificial neural network model 320 may be a machine learning model trained to recognize user behavior patterns and system operation patterns for each of the plurality of users by using log data including user log data and system log data for each of the plurality of users.

According to an embodiment, the first artificial neural network model 320 may perform anomaly detection 322 by using the log data 312. For example, the first artificial neural network model may decide that an anomaly symptom is present when an outlier that does not correspond to the user behavior patterns and system operation patterns for each of the plurality of users is detected in the collected log data 312.

In response to performing the anomaly detection 322, when it is decided that an anomaly symptom is present for at least some of the plurality of users or systems, anomaly data may be extracted. In this connection, the second artificial neural network model 330 may generate first message data 332 in a natural language form including information on the anomaly symptom using the anomaly data. The first message data 332 generated as such may be transmitted to the user terminal 340.

According to an embodiment, the security manager associated with the user terminal 340 may check the first message data 332 through the chat room of the security application and provide second message data 342 including a query about the anomaly symptom to the third artificial neural network model 350. In this connection, the third artificial neural network model 350 may generate third message data 352 including an answer to the query and transmit the generated third message data 352 to the user terminal 340. For example, the third artificial neural network model 350 may receive anomaly data 334 from the second artificial neural network model 330, analyze the anomaly data 334, and generate and transmit the third message data 352 including the answer to the query.

According to an embodiment, the user terminal 340 may provide the third artificial neural network model 350 with fourth message data 344 for executing security measures for anomaly symptoms. In this connection, the third artificial neural network model 350 may perform a function call 354 associated with the fourth message data 344 among a plurality of predefined functions for security measures. When the function call 354 is performed as such, an API server 360 may operate the API associated with the called function to perform an anomaly symptom measure 362.

Figure 4:
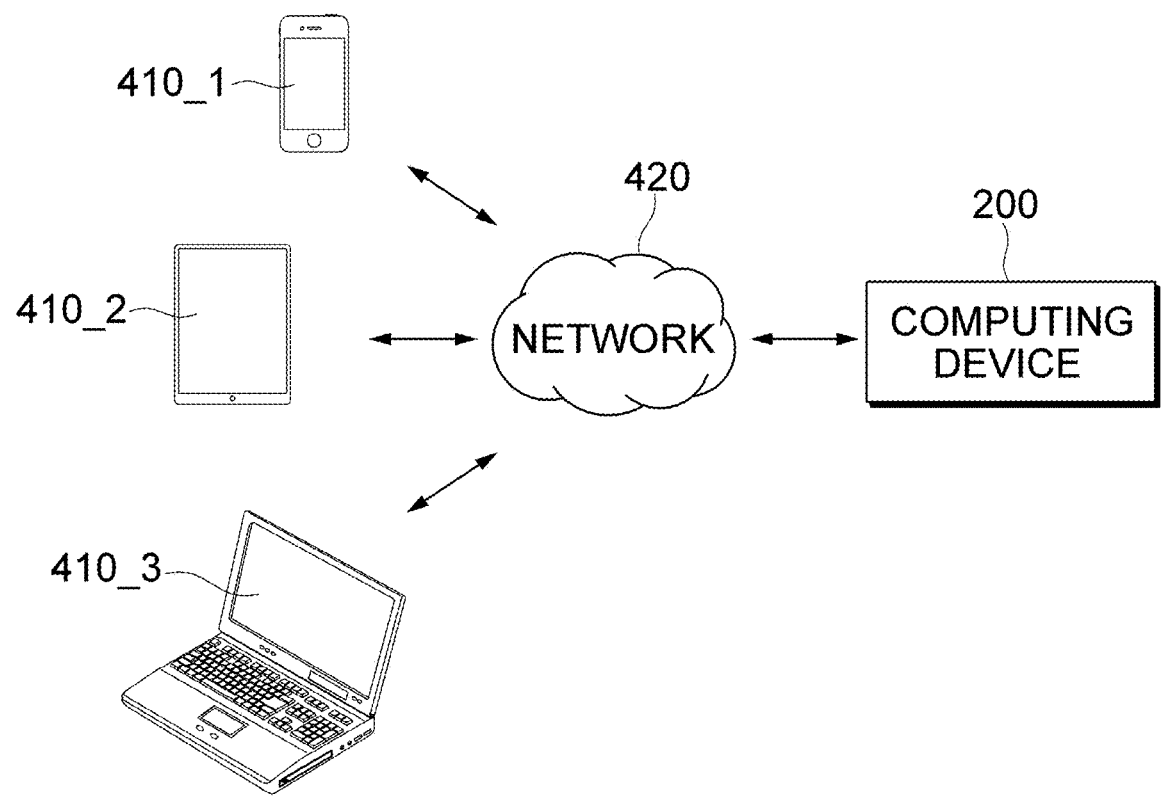
FIG. 4 is a schematic diagram illustrating a configuration in which a computing device is connected to a plurality of user terminals so as to enable communication in order to provide an instant messaging-based security solution according to an embodiment of the present disclosure.

FIG. 4 is a schematic diagram illustrating a configuration in which the computing device 200 is connected to a plurality of user terminals 410_1, 410_2, and 410_3 so as to enable communication in order to provide an instant messaging-based security solution according to an embodiment of the present disclosure. The computing device 200 may include system(s) capable of providing a security solution (for example, anomaly detection and security measure service via instant messaging) through a network 420. According to an embodiment, the computing device 200 may include one or more server devices and/or databases capable of storing, providing, and executing computer-executable programs (for example, downloadable applications) and data related to the security solution, or one or more distributed computing devices and/or distributed databases based on cloud computing services. For example, the computing device 200 may include separate systems (for example, servers) for providing the security solution and/or the instant messaging service.

The security solution provided by the computing device 200 may be provided to a user (for example, a security manager) through the security application installed on each of the plurality of user terminals 410_1, 410_2, and 410_3. For example, instant messaging services provided through the security application may include, but are not limited to, text messaging services, image messaging services, and video messaging services for communication between the computing device 200 and the user, and may further include services based on any type of data.

The plurality of user terminals 4101, 410_2, and 410_3 may communicate with the computing device 200 through the network 420. The network 420 may be configured to enable communication between the plurality of user terminals 410_1, 410_2, and 410_3 and the computing device 200. The network 420 may be configured as a wired network such as Ethernet, a wired home network (power line communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method utilizing a communication network (for example, mobile communication network, wired Internet, wireless Internet, broadcasting network, satellite network, and the like) that may be included in the network 420 as well as short-range wireless communication between the user terminals 410_1, 410_2, and 410_3, without being limited thereto.

In FIG. 4, a mobile phone terminal 410_1, a tablet terminal 410_2, and a PC terminal 410_3 are illustrated as the examples of the user terminals, without being limited thereto, and the user terminals 410_1, 410_2, and 410_3 may be any device that is capable of wired and/or wireless communication and that can be installed with the security application and execute the same. For example, the user terminal may include a smart phone, a mobile phone, a navigation system, a computer, a notebook computer, a digital broadcasting terminal, personal digital assistants (PDA), a portable multimedia player (PMP), a tablet PC, a wearable device, an internet of things (IoT) device, a virtual reality (VR) device, an augmented reality (AR) device, and the like. Further, FIG. 4 illustrates that three user terminals 410_1, 410_2, and 410_3 are in communication with the computing device 200 through the network 420, without being limited thereto, and a different number of user terminals may be configured to be in communication with the computing device 200 through the network 420.

According to an embodiment, when anomaly detection is performed, the computing device 200 may generate first message data in a natural language form including information on an anomaly symptom and transmit the same to the user terminals 410_1, 410_2, and 410_3. In addition, the computing device 200 may receive second message data including a query about the anomaly symptom through the chat room from the user terminal 4101, 410_2, and 410_3. In this connection, the computing device 200 may generate third message data including an answer to the query and transmit the same to the user terminal 410_1, 410_2, and 410_3.

Figure 5:
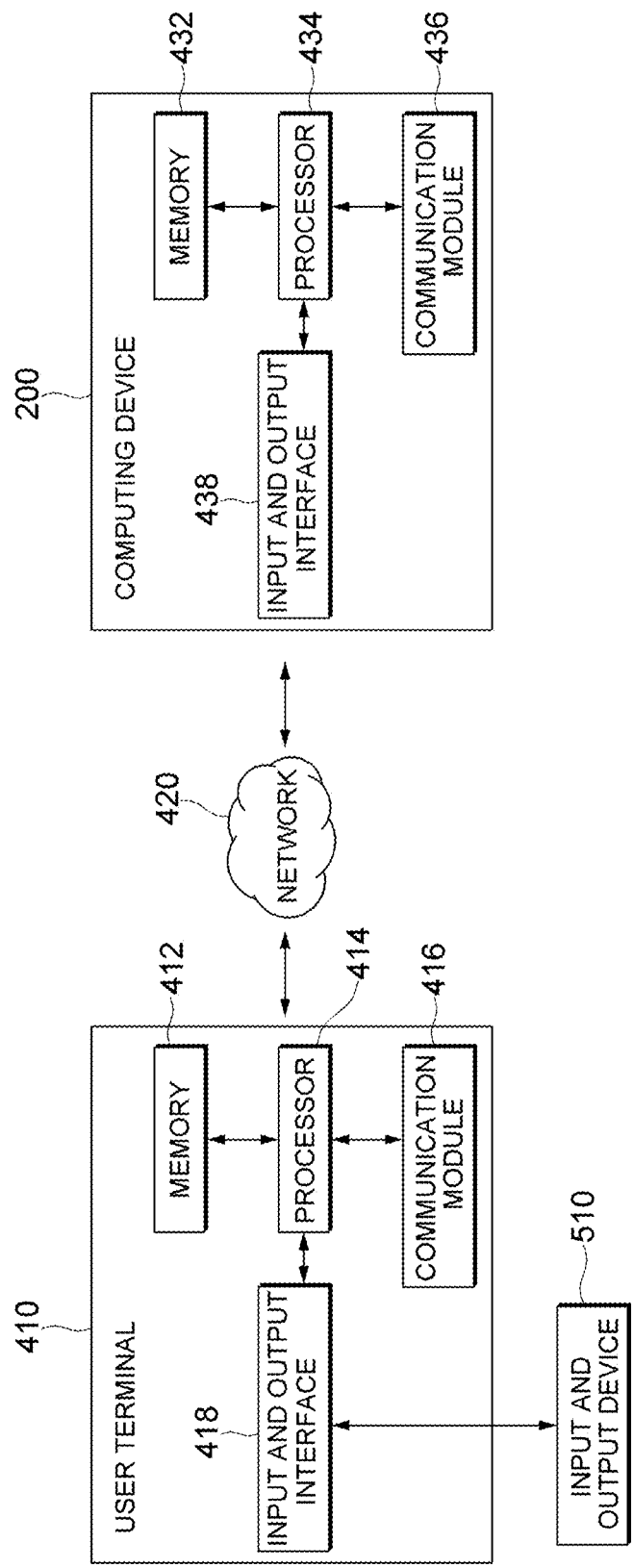
FIG. 5 is a block diagram illustrating the internal configuration of a user terminal and a computing device according to an embodiment of the present disclosure.

FIG. 5 is a block diagram illustrating the internal configuration of the user terminal 410 and the computing device 200 according to an embodiment of the present disclosure. The user terminal 410 may refer to any device capable of executing the security application and capable of wired/wireless communication, and may include, for example, a mobile phone terminal 410_1, a tablet terminal 4102, and a PC terminal 410_3 of FIG. 4. As illustrated, the user terminal 410 may include a memory 412, a processor 414, a communication module 416, and an input and output interface 418. Similarly, the computing device 200 may include a memory 432, a processor 434, a communication module 436, and an input and output interface 438. As illustrated in FIG. 5, the user terminal 410 and the computing device 200 may be configured to communicate information and/or data through the network 420 using their respective communication modules 416 and 436. In addition, an input and output device 510 may be configured to input information and/or data to the user terminal 410 or output information and/or data generated from the user terminal 410 through the input and output interface 418.

The memories 412 and 432 may include any non-transitory computer-readable recording medium. According to an embodiment, the memories 412 and 432 may include a permanent mass storage device such as random access memory (RAM), read only memory (ROM), disk drive, solid state drive (SSD), flash memory, and the like. As another example, a non-destructive mass storage device such as ROM, SSD, flash memory, disk drive, and the like may be included in the user terminal 410 or the computing device 200 as a separate permanent storage device that is separate from the memory. In addition, an operating system and at least one program code (for example, a code for the security applications installed and driven on the user terminal 410) may be stored in the memories 412 and 432.

These software components may be loaded from a computer-readable recording medium separate from the memories 412 and 432. Such a separate computer-readable recording medium may include a recording medium directly connectable to the user terminal 410 and the computing device 200, and may include a computer-readable recording medium such as a floppy drive, a disk, a tape, a DVD/CD-ROM drive, a memory card, and the like, for example. As another example, the software components may be loaded into the memories 412 and 432 through the communication modules 416 and 436 rather than the computer-readable recording medium. For example, at least one program may be loaded into the memories 412 and 432 based on a computer program (for example, applications that provide instant messaging services or security measures solutions) installed by files provided by developers or a file distribution system for distributing an installation file of an application through the network 420.

The processors 414 and 434 may be configured to process instructions of the computer program by performing basic arithmetic, logic, and input and output arithmetic operations. The instructions may be provided to the processors 414 and 434 from the memories 412 and 432 or the communication modules 416 and 436. For example, the processors 414 and 434 may be configured to execute the received instructions according to program code stored in a recording device such as the memories 412 and 432.

The communication modules 416 and 436 may provide a configuration or function for the user terminal 410 and the computing device 200 to communicate with each other through the network 420, and may provide a configuration or function for the user terminal 410 and/or the computing device 200 to communicate with another user terminal or another system (for example, a separate cloud system). For example, a request (for example, a request security measures) or data generated by the processor 414 of the user terminal 410 according to the program code stored in the recording device such as the memory 412 or the like may be transmitted to the computing device 200 through the network 420 under the control of the communication module 416. Conversely, a control signal or instructions provided under the control of the processor 434 of the computing device 200 may be received by the user terminal 410 through the communication module 416 of the user terminal 410 via the communication module 436 and the network 420. For example, the user terminal 410 may receive information on anomaly symptoms from the computing device 200.

The input and output interface 418 may be a member for interfacing with the input and output device 510. As an example, the input device may include a device such as a keyboard, a microphone, a mouse, and a camera including an audio sensor and/or an image sensor, and the output device may include a device such as a display, a speaker, a haptic feedback device, and the like. As another example, the input and output interface 318 may be a member for interfacing with a device such as a touch screen or the like that integrates a configuration or function for performing inputting and outputting.

While FIG. 5 illustrates that the input and output device 510 is not included in the user terminal 410, without being limited thereto, and the input and output device 510 may be configured as one device with the user terminal 410. In addition, the input and output interface 438 of the computing device 200 may be a member for interfacing with a device (not shown) for inputting or outputting, which may be connected to the computing device 200 or included in the computing device 200. In FIG. 5, the input and output interfaces 418 and 438 are illustrated as the components configured separately from the processors 414 and 434, but are not limited thereto, and the input and output interfaces 418 and 438 may be configured to be included in the processors 414 and 434.

The user terminal 410 and the computing device 200 may include more components than the components shown in FIG. 5. However, it would be unnecessary to exactly illustrate most of the related components. According to an embodiment, the user terminal 410 may be implemented to include at least a portion of the input and output devices 510 described above. In addition, the user terminal 410 may further include other components such as a transceiver, a global positioning system (GPS) module, a camera, various sensors, a database, and the like. For example, when the user terminal 410 is a smartphone, it may generally include components included in the smartphone, and for example, it may be implemented such that various components such as an acceleration sensor, a gyro sensor, a camera module, various physical buttons, buttons using a touch panel, input and output ports, a vibrator for vibration, and the like are further included in the user terminal 410.

According to an embodiment, the processor 414 of the user terminal 410 may be configured to operate a security application or a web browser application for providing an instant messaging service and/or a security solution. In this connection, a program code associated with the application may be loaded into the memory 412 of the user terminal 410. While the application is being operated, the processor 414 of the user terminal 410 may receive information and/or data provided from the input and output device 510 through the input and output interface 418 or may receive information and/or data from the computing device 200 through the communication module 416, and may process the received information and/or data and store the same in the memory 412. In addition, such information and/or data may be provided to the computing device 200 through the communication module 416.

While the security application is being operated, the processor 414 may receive voice data, texts, images, videos, and the like, which may be inputted or selected through the input device such as a camera, a microphone, or the like including touch screens, keyboards, audio sensors and/or image sensors connected to the input and output interface 418, and store the received voice data, texts, images and/or videos in the memory 412 or provide the same to the computing device 200 through the communication module 416 and the network 420. In an embodiment, the processor 414 may receive a message transmission request from a user through the input device and provide the data/request to the computing device 200 through the network 420 and the communications module 416.

The processor 434 of the computing device 200 may be configured to manage, process, and/or store information and/or data received from the plurality of user terminals and/or a plurality of external systems. According to an embodiment, the processor 434 may store, process, and transmit message data received from the user terminal 410. For example, when the processor 434 receives message data for executing security measures from the user terminal 410, the processor 434 may call a function associated with the message data to perform measures for an anomaly symptom.

Figure 6:
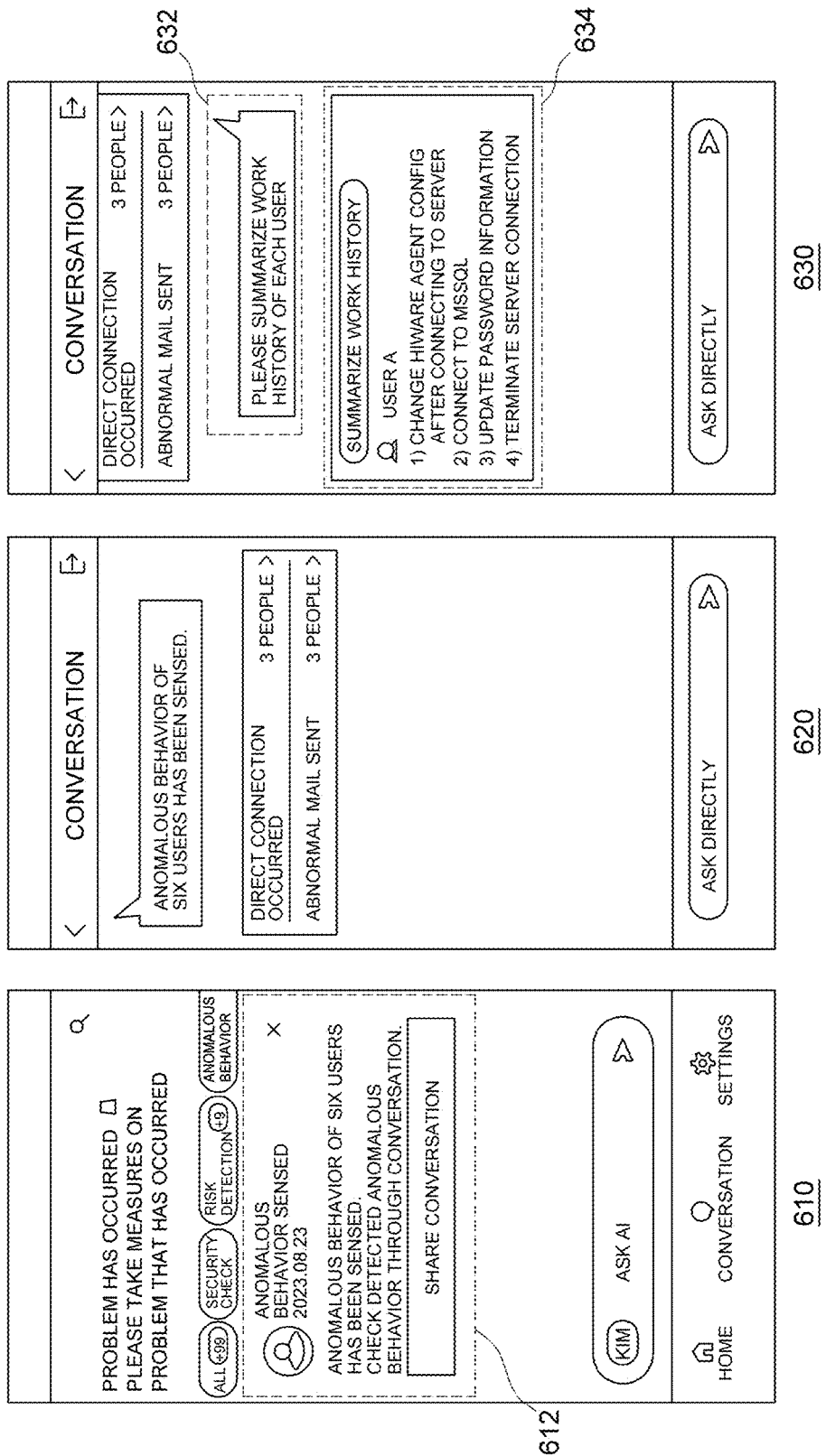
FIG. 6 is a diagram illustrating an example of transmitting a message including information on an anomaly symptom through a security application according to an embodiment of the present disclosure.

FIG. 6 is a diagram illustrating an example of transmitting a message including information on an anomaly symptom through a security application according to an embodiment of the present disclosure. A user (for example, a security manager) may receive a message transmitted by the computing device through the chat room on the security application that provides an instant messaging service. According to an embodiment, the user may receive and check information on an anomaly symptom through a first operation 610, a second operation 620, and a third operation 630.

The first operation 610 shows an example in which a message (for example, first message data) 612 received from the computing device and/or the chat room including the message 612 is displayed on a display of the user terminal. As described above, when an anomaly symptom is detected, the computing device may generate a natural language message 612 including information on the anomaly symptom and transmit the same to the user terminal, and the user terminal may display the received message 612 on the display. For example, the message 612 may include text data such as "Anomalous behavior sensed. Anomalous behavior of 6 users has been sensed." and a "Share Chat" button.

The second operation 620 shows an example in which, when a user selects the "Share Chat" button of the message 612, the chat room associated with the message 612 is activated and detailed information of the message 612 is displayed on the display. In the illustrated example, when the anomalous behavior of the user is sensed as an anomaly symptom, information on the type of the anomalous behavior, such as "direct connection occurrence" and "abnormal mail sent," may be displayed along with the number of user objects corresponding to each type.

The third operation 630 shows an example in which, when a user enquires about an anomaly symptom through the chat room, an answer thereto is automatically generated and displayed on the display. In the illustrated example, the user may request the work history of users corresponding to the anomaly symptom by inputting a message (for example, second message data) 632 such as "Please summarize the work history of each user." In this connection, the computing device may analyze the content of the message 632, generate or extract work history (for example, third message data) 634 of user A, and then provide the same to the user terminal.

In FIG. 6, one chat room related to the anomalous behavior of a user is illustrated as being generated, but this is not limited thereto. When a plurality of anomaly symptoms are sensed, a plurality of chat rooms may be generated and displayed for each sensed anomaly symptom. With this configuration, the user may not only check whether an anomaly symptom occurs in real time, but also easily check detailed information on the anomaly symptom that occurred through the chat room.

Figure 7:
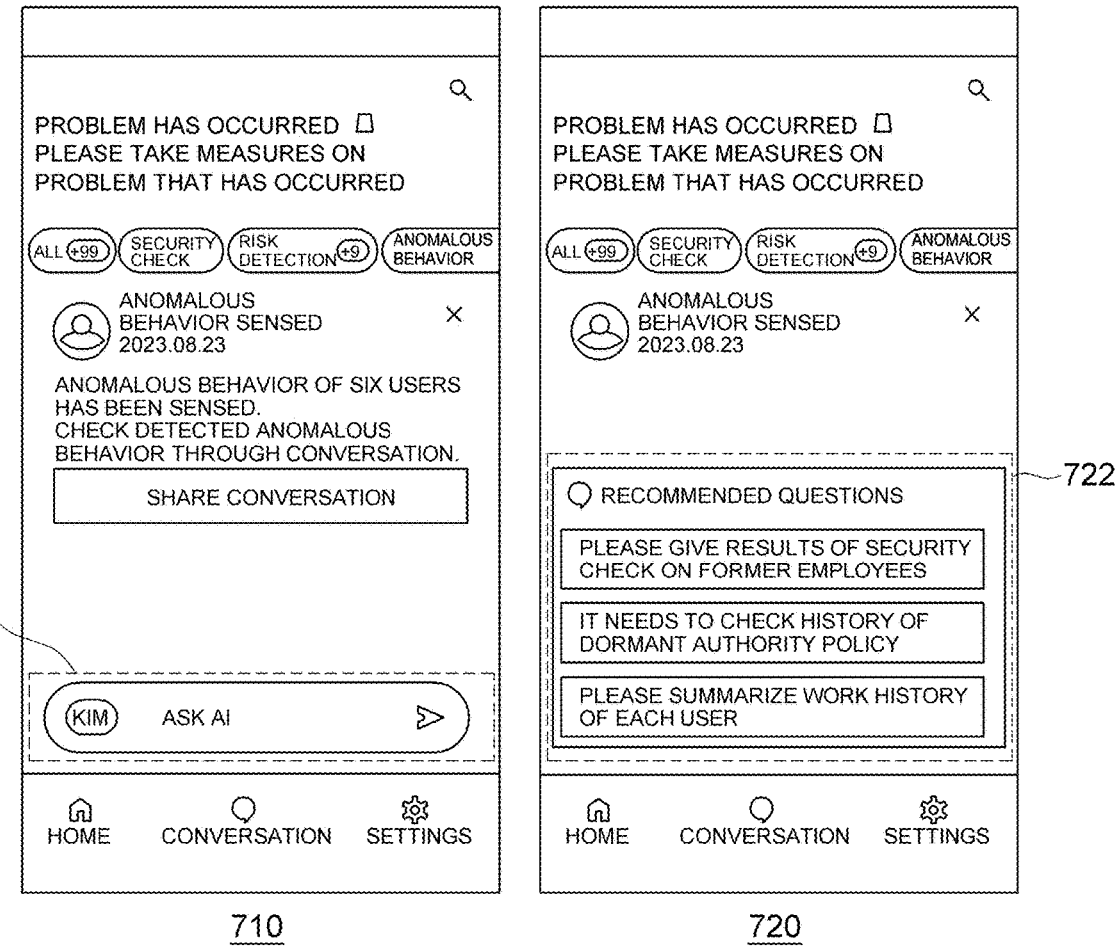
FIG. 7 is a diagram illustrating an example of displaying list data including a list of recommended questions according to an embodiment of the present disclosure.

FIG. 7 is a diagram illustrating an example of displaying list data including a list of recommended questions according to an embodiment of the present disclosure. As described above, a user (for example, a security manager) may check an anomaly symptom through the chat room on the security application that provides an instant messaging service and request additional information thereon. According to an embodiment, the user may send a query about the anomaly symptom through the first operation 710 and the second operation 720.

The first operation 710 shows an example of displaying a chat window 712 that may request additional information on a message (for example, first message data) received from the computing device when displayed on the display of the user terminal. A user may query about the anomaly symptom in the chat window 712 and acquire an answer from the computing device.

The second operation 720 shows an example in which a list of recommended questions 722 associated with an anomaly symptom is displayed when a user selects the chat window 712 by touch input. For example, the computing device may generate list data including a list of recommended questions associated with the detected anomaly symptom, associate the generated list data with the chat room, and provide the same to the user terminal. Based on the list data provided as such, the list of recommended questions 722 may be displayed on the display.

According to an embodiment, a user may select one of the recommended questions included in the list of recommended questions 722 by touch input, and perform a query corresponding to an anomaly symptom. For example, when a user selects a recommended question such as "summarize the work history of each user," the computing device may analyze the content of the recommended question, generate or extract work history of user A (for example, 634 of FIG. 6), etc., and then provide the result to the user terminal.

In FIG. 7, the list of recommended questions 722 is illustrated as including three recommended questions, but this is not limited thereto, and the list of recommended questions 722 may include any number and content of recommended questions depending on the type of anomaly symptom. With this configuration, a user may easily request additional information on the anomaly symptom merely by selecting a question included in the list of recommended questions 722 by touch input.

Figure 8:
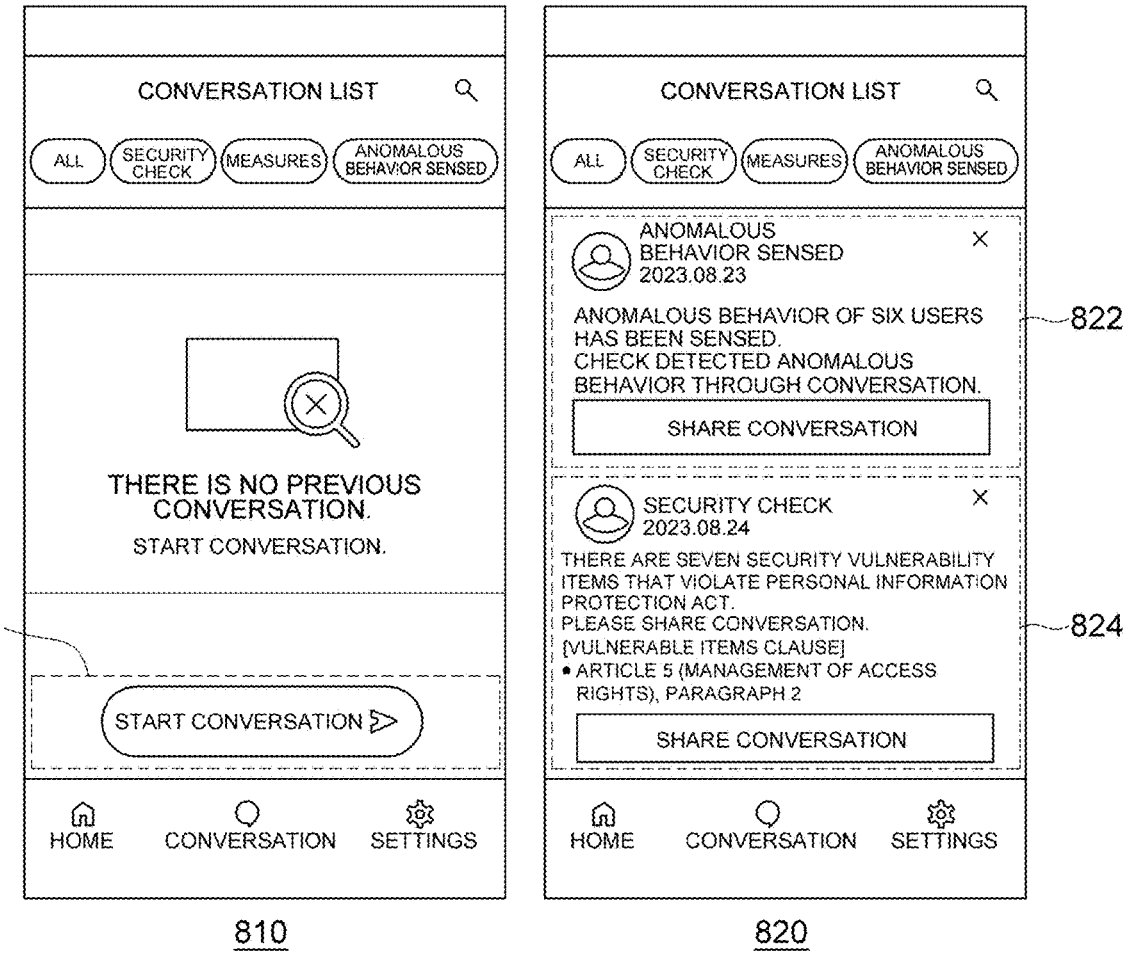
FIG. 8 is a diagram illustrating an example of displaying a conversation list according to an embodiment of the present disclosure.

FIG. 8 is a diagram illustrating an example of displaying a conversation list according to an embodiment of the present disclosure. As described above, when an anomaly symptom occurs, a separate chat room may be generated for each anomaly symptom, and the chat room generated as such may be displayed in the conversation list.

A first operation 810 shows an example of the conversation list displayed on the display of the user terminal when there is no detected anomaly symptom. As illustrated, when there is no detected anomaly symptom or when a user removes all chat rooms, text such as "There are no previous conversations" or "Start a conversation" may be displayed on the display.

A second operation 820 shows an example in which, when two anomaly symptoms are detected, the chat room and/or message corresponding to each anomaly symptom is displayed on the display. For example, when the computing device detects two anomaly symptoms related to "Anomalous behavior sensed" and "Security check," a first chat room 822 related to the anomalous behavior sensed may be generated and a second chat room 824 related to the security check may be generated and displayed on the display.

Figure 9:
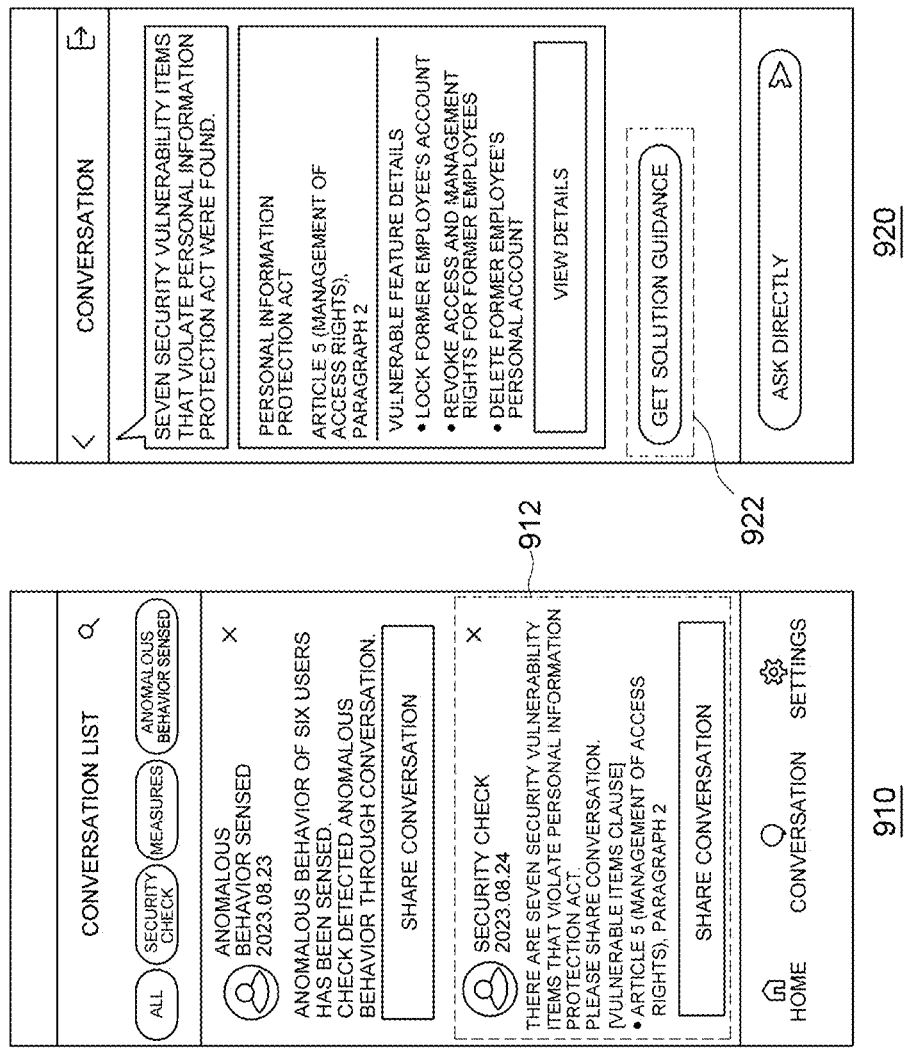
FIG. 9 is a diagram illustrating an example of providing a solution for an anomaly symptom according to an embodiment of the present disclosure.

FIG. 9 is a diagram illustrating an example of providing a solution for an anomaly symptom according to an embodiment of the present disclosure. A user (for example, a security manager) may check an anomaly symptom through the chat room on the security application providing an instant messaging service and may be provided with a solution for the anomaly symptom. According to an embodiment, the user may check a solution for the anomaly symptom through a first operation 910, a second operation 920, and a third operation 930.

The first operation 910 shows an example in which the chat room and/or message related to an anomaly symptom is displayed on the display of the user terminal. As described above, when the computing device detects two anomaly symptoms related to "Anomalous behavior sensed" and "Security check," a first chat room related to anomalous behavior sensed may be generated, and a second chat room 912 related to security check may be generated and displayed on the display.

The second operation 920 shows an example in which, when a user selects a "chat" button associated with the second chat room 912 by touch input, the chat room 912 is activated, and a message associated with the anomaly symptom is displayed on the display. For example, when the chat room 912 is activated, text data such as "Seven security vulnerability items that violate the Personal Information Protection Act were found," legal provisions of the Personal Information Protection Act, and a button 922 such as "Get solution guidance" may be displayed on the display.

The third operation 930 shows an example in which, when a user selects the button 922 by touch input, a message 932 including content related to security measures is displayed on the display. For example, the computing device may transmit the message 932 that guides "Set up after N days of leaving the company" as a solution to a security vulnerability item under the Personal Information Protection Act to the user terminal, and the user terminal may display the message 932 received as such on the display.

With this configuration, a user may not only request information on an anomaly symptom, but also easily receive a security measure for resolving the anomaly symptom through the chat room, thereby performing the optimal security measure.

Figure 10:
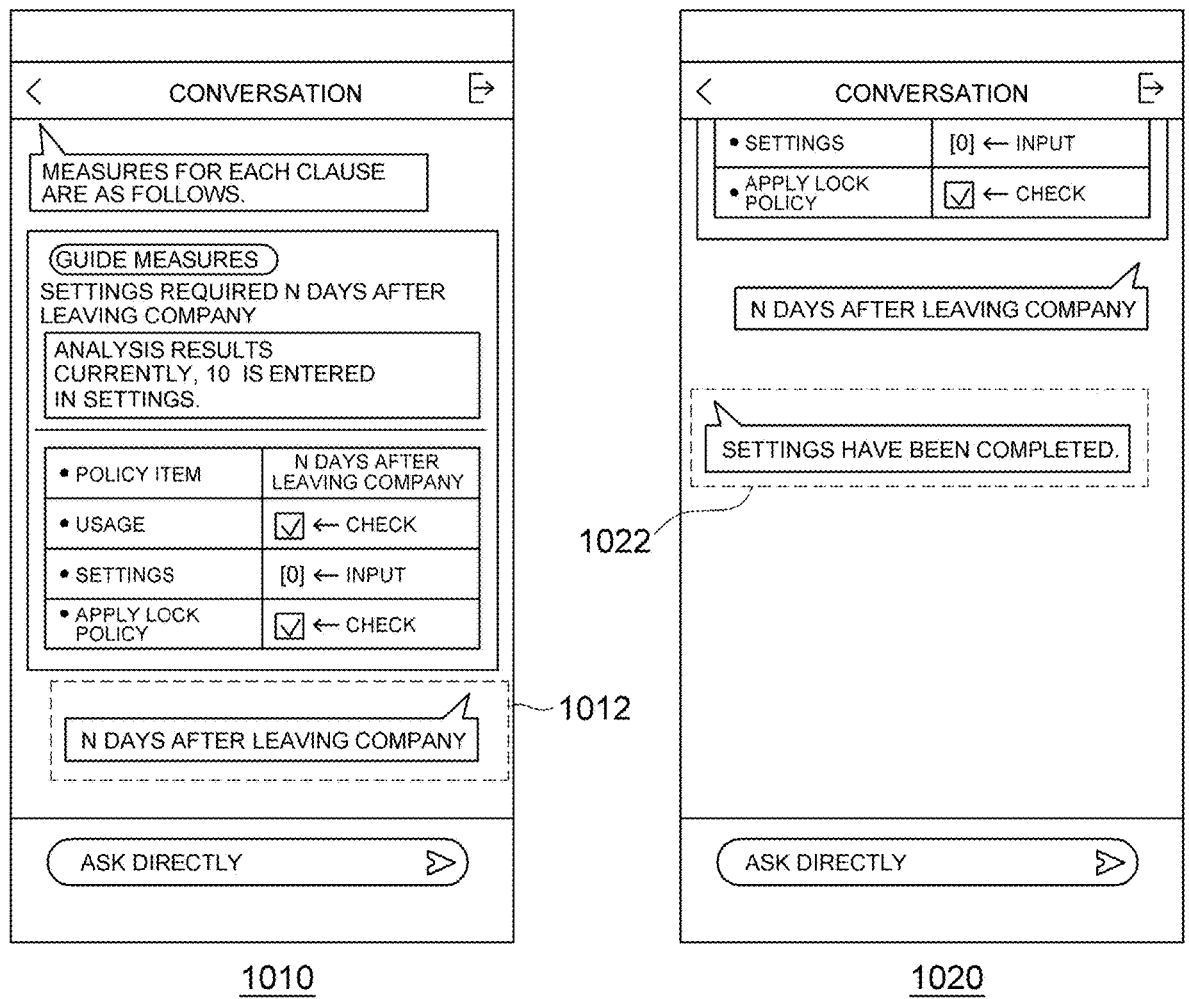
FIG. 10 is a diagram illustrating an example of performing a security measure for an anomaly symptom according to an embodiment of the present disclosure.

FIG. 10 is a diagram illustrating an example of performing a security measure for an anomaly symptom according to an embodiment of the present disclosure. A user (for example, a security manager) may check an anomaly symptom and request a security measure through the chat room on the security application that provides an instant messaging service. According to an embodiment, the user may request the security measure for the anomaly symptom through a first operation 1010 and a second operation 1020.

The first operation 1010 shows an example in which a user transmits a message (for example, fourth message data) 1012 for executing a security measure for an anomaly through the chat room. For example, the user may check a message (for example, third message data) including content regarding the security measure displayed on the display and input and transmit the message 1012 for executing the security measure.

The second operation 1020 shows an example in which a guidance message 1022 is displayed on the display in response to the message transmitted by a user. For example, when the user transmits the message 1012 for executing the security measure, the computing device may call a function associated with the corresponding message 1012 among a plurality of functions to perform a measure for an anomaly symptom. When the measure for the anomaly symptom is completed, the computing device may transmit the guidance message 1022 such as "Setup completed." to the user terminal.

According to an embodiment, when receiving a message for executing security measures for an anomaly symptom through the chat room from the user terminal, the computing device may call a function associated with the message. When the function is called as such, the API associated with the called function may be operated to perform the measure for the anomaly symptom.

Figure 11:
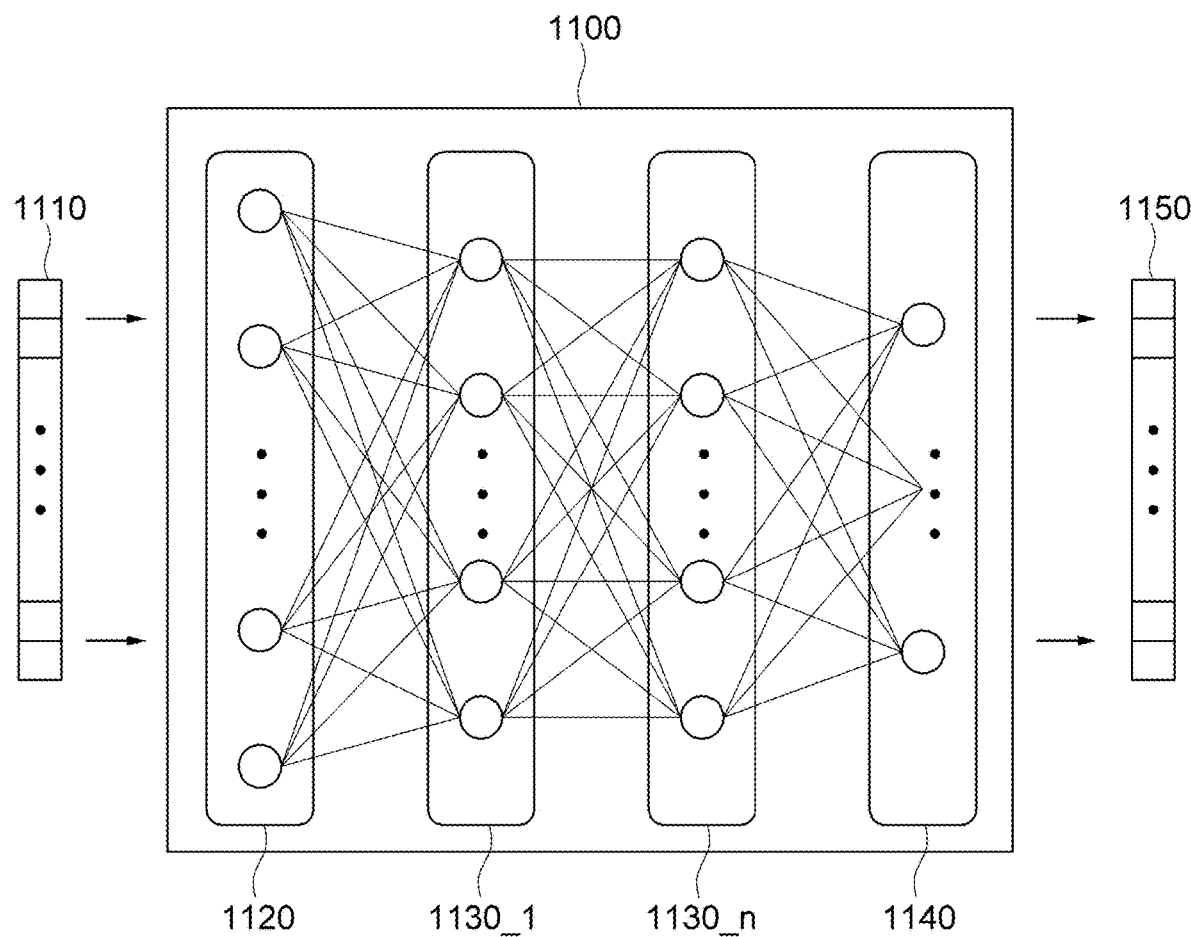
FIG. 11 is an example diagram illustrating an artificial neural network model according to an embodiment of the present disclosure.

FIG. 11 is an example diagram illustrating an artificial neural network model 1100 according to an embodiment of the present disclosure. The artificial neural network model 1100 is an example of a machine learning model, and in machine learning technology and cognitive science, is a statistical learning algorithm implemented based on the structure of a biological neural network or a structure that executes the algorithm.

According to an embodiment, the artificial neural network model 1100 may represent a machine learning model that has a problem solving ability by repeatedly adjusting the weights of synapses by the nodes that are artificial neurons forming the network through synaptic combinations as in the biological neural networks, thus training to reduce errors between a correct output corresponding to a specific input and a deduced output. For example, the artificial neural network model 1100 may include any probability model, neural network model, and the like, that is used in artificial intelligence learning methods such as machine learning and deep learning.

The artificial neural network model 1100 is implemented as a multilayer perceptron (MLP) formed of multilayer nodes and connections therebetween. The artificial neural network model 1100 according to an embodiment may be implemented using one of various artificial neural network model structures including the MLP. As illustrated in FIG. 11, the artificial neural network model 1100 includes an input layer 1120 receiving an input signal or data 1110 from the outside, an output layer 1140 outputting an output signal or data 1150 corresponding to the input data, and (n) number of hidden layers 1130_1 to 1130_n (where n is a positive integer) positioned between the input layer 1120 and the output layer 1140 to receive a signal from the input layer 1120, extract the features, and transmit the features to the output layer 1140. Herein, the output layer 1140 receives signals from the hidden layers 1130_1 to 1130_n and outputs the same to the outside.

The training method of the artificial neural network model 1100 includes a supervised learning that trains for optimization for solving a problem with inputs of teacher signals (correct answer), and an unsupervised learning that does not require a teacher signal. According to an embodiment, the input variables of the artificial neural network model 1100 may include log data and anomaly data. When the input variables described above are input through the input layer 1120, the output variables output from the output layer 1140 of the artificial neural network model 1100 may be an anomaly detection result.

As described above, the input layer 1120 and the output layer 1140 of the artificial neural network model 1100 are respectively matched with a plurality of output variables corresponding to a plurality of input variables, so as to adjust the synaptic values between nodes included in the input layer 1120, the hidden layers 1130_1 to 1130_n, and the output layer 1140, thereby training to extract the correct output corresponding to a specific input. Through this training process, the features hidden in the input variables of the artificial neural network model 1100 may be identified, and the synaptic values (or weights) between the nodes of the artificial neural network model 1100 may be adjusted so as to reduce the errors between the output variable calculated based on the input variable and the target output.

Figure 12:
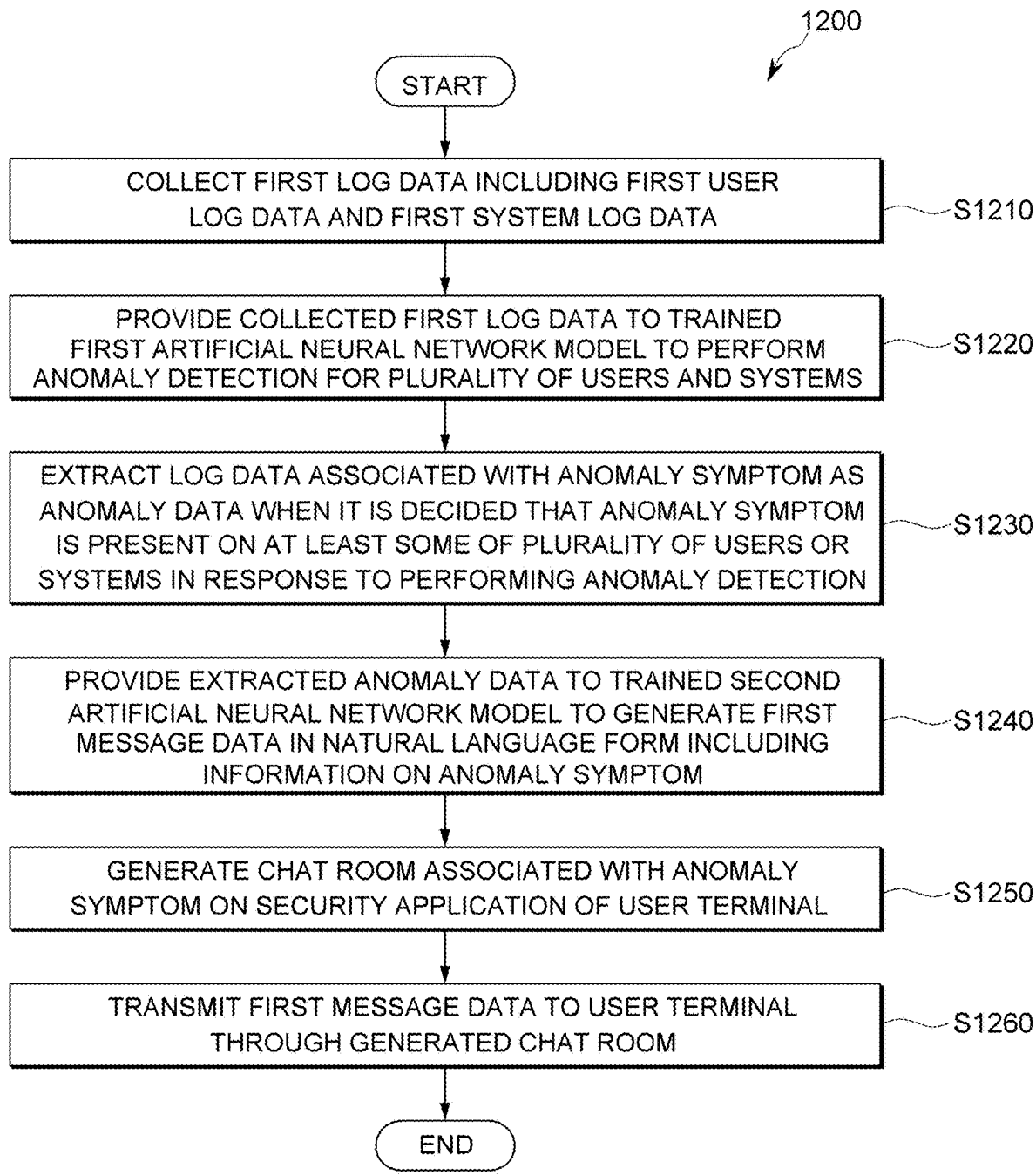
FIG. 12 is a diagram illustrating an example of an anomaly detection method based on an artificial neural network according to an embodiment of the present disclosure.

FIG. 12 is a diagram illustrating an example of an anomaly detection method 1200 based on an artificial neural network according to an embodiment of the present disclosure. The anomaly detection method 1200 based on the artificial neural network may be performed by at least one processor (for example, at least one processor of the computing device). The anomaly detection method 1200 based on the artificial neural network may be initiated by the processor collecting first log data including first user log data and first system log data (S1210).

The processor may perform anomaly detection for a plurality of users and systems by providing the collected first log data to a trained first artificial neural network model (S1220). For example, the processor may collect second log data including second user log data and second system log data for each of the plurality of users, and provide the collected second log data to the first artificial neural network model to train user behavior patterns and system operation patterns for each of the plurality of users. In this connection, the first artificial neural network model may decide that an anomaly symptom is present when an outlier that does not correspond to the user behavior patterns and system operation patterns for each of the plurality of users is detected in the collected first log data.

In response to performing the anomaly detection, when it is decided that an anomaly symptom is present for at least some of the plurality of users or the system, the processor may extract log data associated with the anomaly symptom as anomaly data (S1230). In addition, the processor may provide the extracted anomaly data to a trained second artificial neural network model to generate first message data in a natural language form including information on the anomaly symptom (S1240). For example, the processor may decide an object and type corresponding to the anomaly symptom based on anomaly data, and generate information on the anomaly symptom including a description of the object and type corresponding to the decided anomaly symptom.

The processor may generate the chat room associated with the anomaly symptom on the security application of the user terminal (S1250). In addition, the processor may transmit first message data to the user terminal through the generated chat room (S1260).

According to an embodiment, the processor may receive second message data including a query about an anomaly symptom from the user terminal through the chat room. For example, the processor may generate list data including a list of recommended questions associated with the anomaly symptom, associate the generated list data with the chat room, provide the user terminal with the list data, and receive second message data including a query about the anomaly symptom in response to a user input selecting one of the recommended questions included in the list data. In this connection, the processor may provide the second message data to a trained third artificial neural network model to generate third message data including an answer to the query, and transmit the generated third message data to the user terminal through the chat room.

The processor may receive fourth message data for executing security measures for an anomaly symptom from user terminal through the chat room, and provide the fourth message data to the trained third artificial neural network model to call a function associated with the fourth message data among a plurality of functions. When the function is called as such, the processor may perform measures for the anomaly symptom by operating the API associated with the called function.

The aforementioned method and/or various embodiments may be implemented in digital electronic circuitry, computer hardware, firmware, software, and/or combinations thereof. Various example embodiments may be executed by a data processing device, for example, one or more programmable processors and/or one or more computing devices, or may be implemented as a computer program stored in a computer-readable recording medium and/or computer-readable recording medium. The aforementioned computer program may be written in any form of programming language including a compiled language or an interpreted language, and may be distributed in any form such as a stand-alone program, a module, a subroutine, or the like. The computer program may be distributed through one computing device, a plurality of computing devices connected through the same network, and/or a plurality of distributed computing devices connected through a plurality of different networks.

The methods and/or various embodiments described above may performed by one or more processors configured to execute one or more computer programs that process, store, and/or manage any functions, etc., by operating on the basis of input data or generating output data. For example, the method and/or various example embodiments may be performed by a special purpose logic circuit such as a field programmable gate array (FPGA) or application specific integrated circuit (ASIC), and the device and/or systems for carrying out the method and/or various example embodiments may be implemented as special purpose logic circuits such as FPGAs or ASICs.

The one or more processors executing the computer program may include general purpose or special purpose microprocessors and/or one or more processors of any kind of digital computing device. The processor may receive instructions and/or data from each of the read-only memory and the random access memory, or may receive instructions and/or data from the read-only memory and the random access memory. In an embodiment of the present disclosure, the components of a computing device performing the method and/or embodiments may include one or more processors for executing instructions, one or more memory devices for storing instructions and/or data.

According to an embodiment, the computing device may send and receive data to and from one or more mass storage devices for storing data. For example, the computing device may receive data from, and/or transmit data to, a magnetic or optical disc. A computer-readable storage medium suitable for storing instructions and/or data associated with a computer program includes a semiconductor memory device such as an erasable programmable read-only memory (EPROM), an electrically erasable PROM (EEPROM), or a flash memory device. It may include any type of non-volatile memory, but is not limited thereto. For example, computer-readable storage media may include magnetic disks such as internal hard disks or removable disks, magneto-optical disks, CD-ROM and DVD-ROM disks.

To provide for interaction with a user, the computing device may include, but is not limited to, a display device (for example, a cathode ray tube (CRT), liquid crystal display (LCD), etc.) for presenting or displaying information to the user, and a pointing device (for example, a keyboard, a mouse, a trackball, etc.) through which a user may provide input and/or instructions, etc. on the computing device. In other words, the computing device may further include any other kind of devices for providing interaction with a user. For example, the computing device may provide any form of sensory feedback to the user for interaction with the user, including visual feedback, auditory feedback, and/or tactile feedback, and the like. In contrast, the user may provide an input to the computing device through various gestures such as sight, voice, and motion.

In an embodiment of the present disclosure, various embodiments may be implemented in a computing system including a back-end component (for example, a data server), a middleware component (for example, an application server) and/or a front-end component. In this case, the components may be interconnected by any form or medium of digital data communication, such as a communication network. For example, the communication network may include a local area network (LAN), a wide area network (WAN), and the like.

A computing device based on the exemplary embodiments described herein may be implemented using hardware and/or software configured to interact with a user, including a user device, a user interface (UI) device, a user terminal, or a client device. For example, the computing device may include a portable computing device such as a laptop computer. Additionally or alternatively, the computing device may include personal digital assistants (PDAs), tablet PCs, game consoles, wearable devices, internet of things (IoT) devices, virtual reality (VR) devices, AR (augmented reality) device, but is not limited thereto. The computing device may further include other types of devices configured to interact with the user. In addition, the computing device may include a portable communication device (for example, a mobile phone, a smart phone, a wireless cellular phone, etc.) suitable for wireless communication over a network, such as a mobile communication network, and the like. A computing device may be configured to communicate wirelessly with a network server using wireless communication technologies and/or protocols such as radio frequency (RF), microwave frequency (MWF), and/or infrared ray frequency (IRF).

Various example embodiments, including specific structural and functional details, are exemplary. Accordingly, example embodiments are not limited to those described above, and may be implemented in various other forms. In addition, the terminology used in the present disclosure is for describing some embodiments and is not to be construed as limiting the example embodiments. For example, singular words and the above may be construed to include the plural as well, unless the context clearly dictates otherwise.

In an embodiment of the present disclosure, unless otherwise defined, all terms used herein, including technical or scientific terms, have the same meaning as commonly understood by one of ordinary skill in the art to which the concept belongs. In addition, commonly used terms such as terms defined in the dictionary should be interpreted as having a meaning consistent with the meaning in the context of the related art.

Although the present disclosure has been described with reference to some example embodiments, various modifications and changes can be made without departing from the scope of the present disclosure that can be understood by those skilled in the art to which the present disclosure pertains. Further, such modifications and variations are intended to fall within the scope of the claims appended hereto.

What is claimed is:

1. An anomaly detection method based on an artificial neural network performed by at least one processor, the method comprising:
    collecting first log data comprising first user log data and first system log data;
    providing the collected first log data to a trained first artificial neural network model to perform anomaly detection for a plurality of users and systems;
    extracting log data associated with an anomaly symptom as anomaly data when it is decided that the anomaly symptom is present on at least some of the plurality of users or systems in response to performing the anomaly detection;
    providing the extracted anomaly data to a trained second artificial neural network model to generate first message data in a natural language form comprising information on the anomaly symptom;
    generating a chat room associated with the anomaly symptom on a security application of a user terminal;
    transmitting the first message data to the user terminal through the generated chat room;
    receiving second message data comprising a query about the anomaly symptom from the user terminal through the chat room;
    providing the second message data to a trained third artificial neural network model to generate third message data comprising an answer to the query; and
    transmitting the generated third message data to the user terminal through the chat room;
    wherein the chat room is displayed in a conversation list comprising a plurality of chat rooms separated by each anomaly symptom.

2. The method of claim 1, further comprising:
    collecting second log data comprising second user log data and second system log data for each of the plurality of users; and
    providing the collected second log data to the first artificial neural network model to train a user behavior pattern and a system operation pattern for each of the plurality of users.

3. The method of claim 1, wherein the first artificial neural network model decides that the anomaly symptom is present when an outlier that does not correspond to a user behavior pattern and a system operation pattern for each of the plurality of users is detected in the collected first log data.

4. The method of claim 1, wherein the generation of the first message data in the natural language form comprising the information on the anomaly symptom comprises:
    deciding an object and a type corresponding to the anomaly symptom based on the anomaly data; and
    generating information on the anomaly symptom comprising a description of the object and type corresponding to the decided anomaly symptom.

5. The method of claim 1, further comprising:
    generating list data comprising a list of recommended questions associated with the anomaly symptom; and
    providing the generated list data to the user terminal by associating the same with the chat room,
    wherein the reception of the second message data comprising the query about the anomaly symptom comprises receiving the second message data comprising the query about the anomaly symptom in response to a user input selecting one of the recommended questions included in the list data.

6. The method of claim 1, further comprising:
receiving fourth message data for executing security measures for the anomaly symptom from the user terminal through the chat room;
providing the fourth message data to a trained third artificial neural network model to call a function associated with the fourth message data among a plurality of functions; and
performing measures for the anomaly symptom based on the called function.

7. The method of claim 6, wherein the performance of the measures for the anomaly symptom based on the called function comprises performing the measures for the anomaly symptom by operating an API (application programing interface) associated with the called function when the function is called.

8. A non-transitory computer-readable recording medium storing instructions for execution by one or more processors that, when executed by the one or more processors, cause the one or more processors to perform the method according to claim 1.

9. A computing device comprising:
a communication module;
a memory; and
at least one processor connected to the memory and configured to execute at least one computer-readable program included in the memory,
wherein the at least one program comprises commands for:
collecting first log data comprising first user log data and first system log data;
providing the collected first log data to a trained first artificial neural network model to perform anomaly detection for a plurality of users and systems;
extracting log data associated with an anomaly symptom as anomaly data when it is decided that the anomaly symptom is present on at least some of the plurality of users or systems in response to performing the anomaly detection;
providing the extracted anomaly data to a trained second artificial neural network model to generate first message data in a natural language form comprising information on the anomaly symptom;
generating a chat room associated with the anomaly symptom on a security application of a user terminal associated with a security manager;
transmitting the first message data to the user terminal through the generated chat room;
receiving second message data comprising a query about the anomaly symptom from the user terminal through the chat room;
providing the second message data to a trained third artificial neural network model to generate third message data comprising an answer to the query; and
transmitting the generated third message data to the user terminal through the chat room;
wherein the chat room is displayed in a conversation list comprising a plurality of chat rooms separated by each anomaly symptom.

10. The device of claim 9, wherein the at least one program further comprises commands for:
collecting second log data comprising second user log data and second system log data for each of the plurality of users; and
providing the collected second log data to the first artificial neural network model to train a user behavior pattern and a system operation pattern for each of the plurality of users.

11. The device of claim 9, wherein the first artificial neural network model decides that the anomaly symptom is present when an outlier that does not correspond to a user behavior pattern and a system operation pattern for each of the plurality of users is detected in the collected first log data.

12. The device of claim 9, wherein the at least one program further comprises commands for:
deciding an object and a type corresponding to the anomaly symptom based on the anomaly data; and
generating information on the anomaly symptom comprising a description of the object and type corresponding to the decided anomaly symptom.

13. The device of claim 9, wherein the at least one program further comprises commands for:
generating list data comprising a list of recommended questions associated with the anomaly symptom;
providing the generated list data to the user terminal by associating the same with the chat room; and
receiving the second message data comprising the query about the anomaly symptom in response to a user input selecting one of the recommended questions included in the list data.

14. The device of claim 9, wherein the at least one program further comprises commands for:
receiving fourth message data for executing security measures for the anomaly symptom from the user terminal through the chat room;
providing the fourth message data to a trained third artificial neural network model to call a function associated with the fourth message data among a plurality of functions; and
performing measures for the anomaly symptom based on the called function.

15. The device of claim 14, wherein the at least one program further comprises commands for performing the measures for the anomaly symptom by operating an API associated with the called function when the function is called.

* * * * *